United States Patent [19]

Durkow

[11] Patent Number: 4,573,617

[45] Date of Patent: Mar. 4, 1986

[54] TOOL MEANS FOR SEVERING AN OPTICAL FIBER

[75] Inventor: Carl J. Durkow, Runnemede, N.J.

[73] Assignee: TRW Inc., Redondo Beach, Calif.

[21] Appl. No.: 560,897

[22] Filed: Dec. 14, 1983

[51] Int. Cl.$^4$ .............................................. C03B 37/16
[52] U.S. Cl. ......................................... 225/96; 7/129; 30/164.9; 225/2; 225/103
[58] Field of Search .................... 225/2, 96.5, 96, 103, 225/93; 30/164.9, 164.95; 7/129, 131, 132, 130

[56] References Cited

U.S. PATENT DOCUMENTS

| | | | |
|---|---|---|---|
| 1,396,863 | 11/1921 | Mayhew | 7/131 |
| 2,447,988 | 8/1948 | Pierson | 30/164.9 X |
| 3,525,107 | 8/1970 | Hays | 7/131 X |
| 3,934,773 | 1/1976 | Chinnock et al. | 225/2 |
| 3,947,905 | 4/1976 | Neff | 7/131 X |
| 4,017,013 | 4/1977 | Hawk et al. | 225/96.5 |
| 4,046,298 | 9/1977 | Schroeder, Jr. | 225/2 |
| 4,074,840 | 2/1978 | Fulenwider et al. | 225/96.5 |
| 4,154,385 | 5/1979 | Lewis | 225/96.5 |
| 4,159,793 | 7/1979 | Belmonte et al. | 225/96.5 |
| 4,168,026 | 9/1979 | Lukas et al. | 225/96.5 |
| 4,202,475 | 5/1980 | Hirai et al. | 225/2 |
| 4,229,876 | 10/1980 | Doty | 225/96.5 X |
| 4,257,546 | 3/1981 | Benasutti | 225/96.5 |
| 4,274,572 | 6/1981 | Dunn et al. | 225/96.5 |
| 4,322,025 | 3/1982 | Johnson | 225/96.5 |
| 4,477,942 | 10/1984 | Ridgway | 225/2 X |

OTHER PUBLICATIONS

"Optical Fiber End Preparation for Low-Loss Splices", D. Gloge, P. W. Smith, D. L. Bisbee, E. L. Chinnock, The Bell System Technical Journal, vol. 52, No. 9, Nov. 1973, pp. 1579–1588.

"Simplified Optical-Fibre Breaking Machine", P. Hensel, Electronics Letters, Nov. 27th, 1975, vol. II, No. 24.

"Splice Losses in Step-Index Fibers: Dependency on Fiber-Break Angle", K. S. Gordon, E. G. Rawson, R. E. Norton, Applied Optics, Sep. 1977, vol. 16, No. 9, pp. 2372–2374.

"Optical Fiber Cutting Tool", B. C. Uberbacher, IBM Technical Disclosure Bulletin, May 1979, vol. 21, No. 12, pp. 4947–4948.

Primary Examiner—Frank T. Yost
Attorney, Agent, or Firm—Jack Trachtman; John T. Wiedemann; Donald R. Nyhagen

[57] ABSTRACT

Tool means for severing an optical fiber which comprises first and second members joined together by pivotal connecting means for movement between opened and closed terminal positions. The members each have first portions spaced opposite to each other for providing handle means for moving the members between their opened and closed terminal positions and second portions which are spaced opposite to each other and move closer as the members assume their closed terminal position. The surface of a resilient element carried by the second portion of the first member supports thereon an optical fiber which is to be severed, and a blade means secured with its second portion of the second member has a cutting edge for engaging and inflicting a flaw on the optical fiber when the members are actuated by the handle means to assume their closed terminal position. A pair of resilient pad units are each secured with a respective one of the second ends of the members for receiving therebetween a fiber having an inflicted flaw on its surface for applying compressive force to the fiber for completing the severing operation.

27 Claims, 9 Drawing Figures

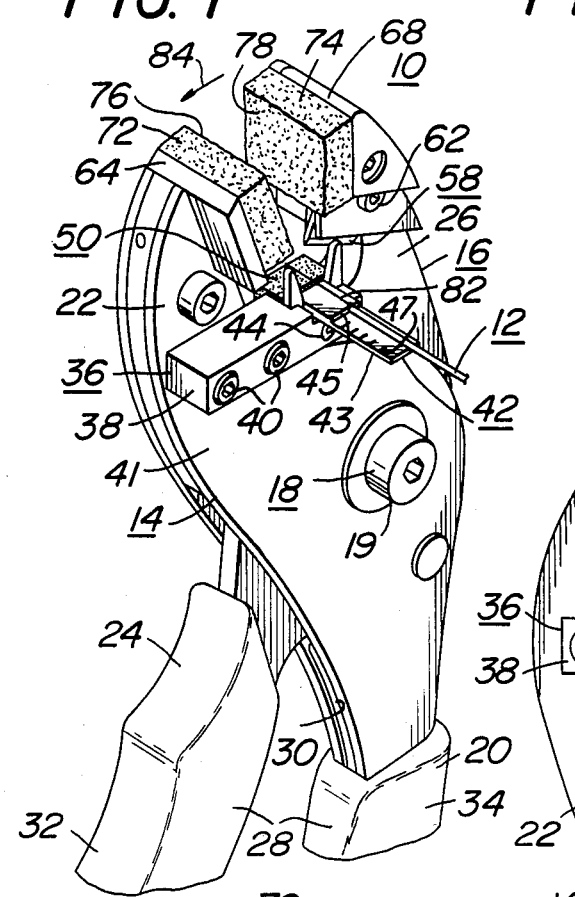
FIG. 1
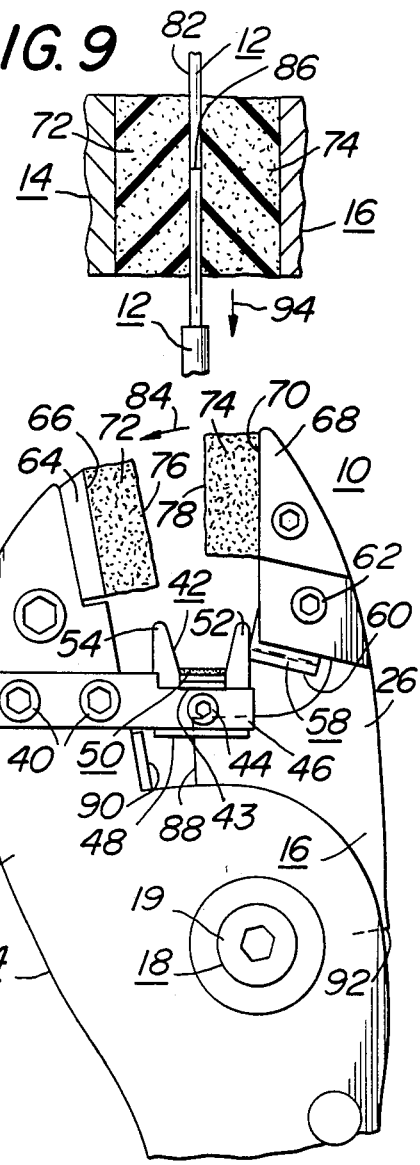
FIG. 9
FIG. 2
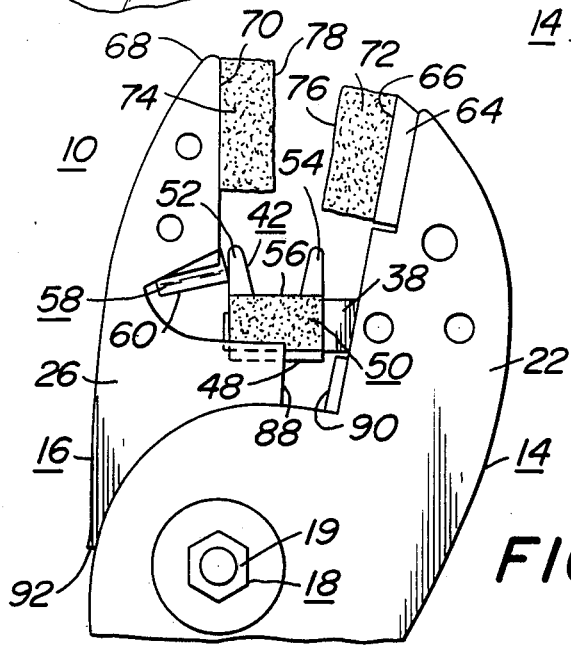
FIG. 3

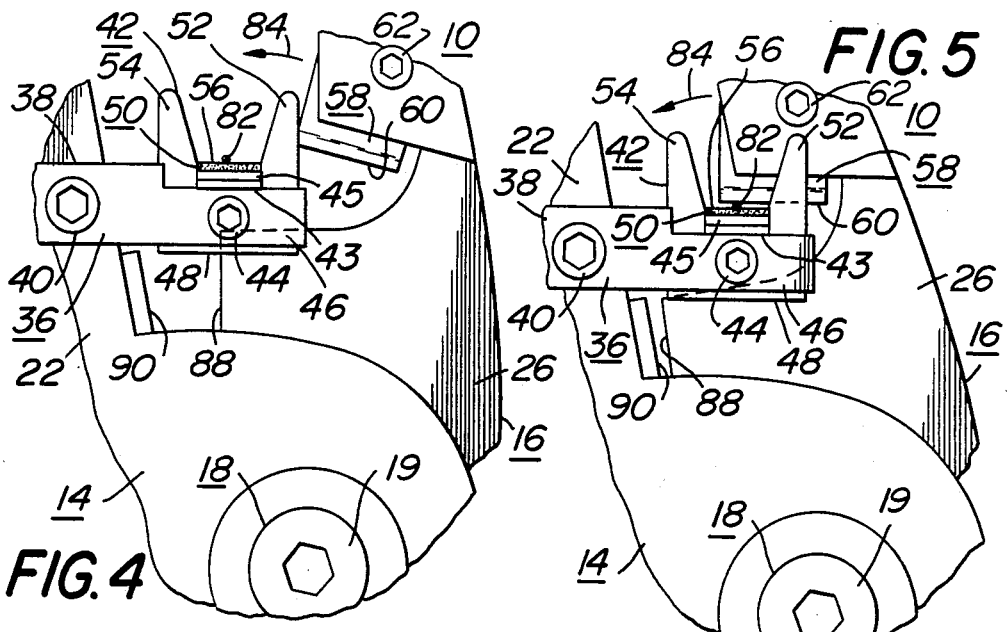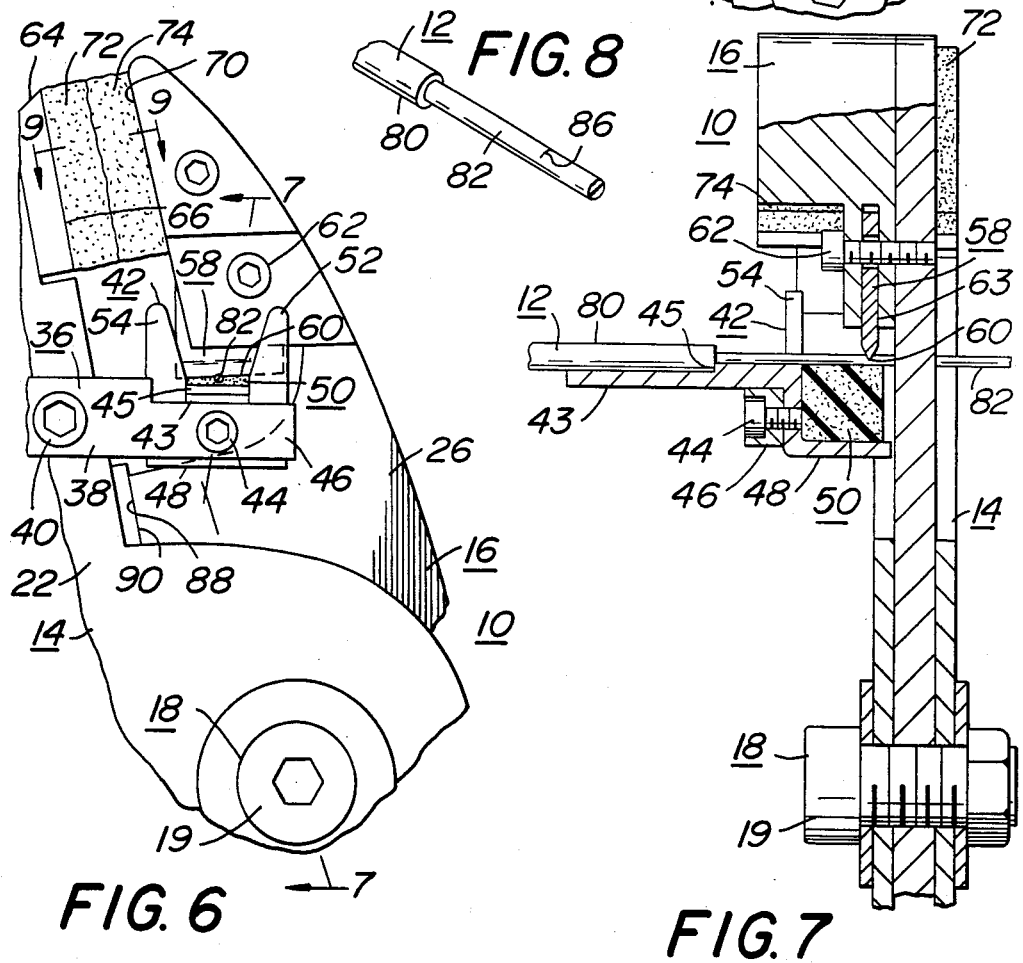

TOOL MEANS FOR SEVERING AN OPTICAL FIBER

BACKGROUND OF THE INVENTION

The invention relates to tool means for severing an optical fiber, and more particularly to a hand held tool means for inflicting a flaw on an optical fiber and severing the fiber to produce end surfaces which are mirror smooth and substantially perpendicular to the fiber axis.

Heretofore, apparatus having elaborate mechanisms and high precision components needing precise adjustments by trained personnel have been required for consistently inflicting a minute flaw on the surface of an optical fiber in the process of severing an optical fiber to produce end surfaces which are mirror smooth and perpendicular to the fiber axis. Because of the high cost of making such precise adjustments, very expensive diamond blades have been utilized for extending the blade usefulness and reducing the frequency of blade replacement, re-honing and the subsequent readjustment and calibration of the apparatus. Such prior art devices often inflict flaws on the surface of optical fibers which are greater than required, resulting in cleaved surfaces having large conchoidal fractures extending into the core of the optical fiber. Such end surfaces result in excessively high transmission loss at the fiber ends or splice locations. It is therefore desirable to provide a tool means for severing optical fibers which overcome the disadvantages of the prior art devices.

SUMMARY OF THE INVENTION

A principal object of the invention, therefore, is to provide a new and improved tool means for severing an optical fiber which consistently provides end surfaces which are mirror smooth and substantially perpendicular to the fiber axis.

Another object of the invention is to provide a new and improved tool means for severing an optical fiber by inflicting a flaw on its surface which provides end surfaces which are mirror smooth and substantially perpendicular to the fiber axis, and have only minimal traces of the initial flaw.

Another object of the invention is to provide a new and improved tool means for severing an optical fiber which may have its components readily replaced and easily adjusted for providing end surfaces which are mirror smooth and substantially perpendicular to the fiber axis.

Another object of the invention is to provide a new and improved tool means for severing an optical fiber which accommodates optical fibers having different diameters and consistently provides end surfaces which are mirror smooth and substantially perpendicular to the fiber axis.

Another object of the invention is to provide a new and improved tool means for severing an optical fiber which inflicts a flaw on the surface of an optical fiber while the fiber surface is in compression for avoiding premature crack propagation and defective end surfaces.

Another object of the invention is to provide a new and improved tool means for severing an optical fiber which allows producing fibers of any desired length with end surfaces which are mirror smooth end surfaces and substantially perpendicular to the fiber axis.

Another object of the invention is to provide a new and improved means for severing an optical fiber which is small and easily held and actuated by one hand for providing the desired fiber severing operations.

Another object of the invention is to provide a new and improved tool means for severing an optical fiber which is simple in structure and may be easily and inexpensively manufactured, and can be maintained at low cost.

The above objects as well as many other objects of the invention are achieved by providing a tool means for severing an optical fiber comprising first and second members which are joined together by a pivotal connection for movement between opened and closed terminal end positions. The members normally are in their opened terminal position and each has first and second portions on opposite sides of the pivotal connection. The first portions of the members are positioned opposite to and spaced from each other for providing handle means for moving the members between their opened and closed terminal positions, while the second portions of the members are spaced opposite to each other when the members are in their normal opened terminal position and move closer to each other as the members assume their closed terminal position with the actuation of the handle means.

A resilient element is carried by the second portion of the first member for supporting on its surface an optical fiber which is to be severed. A blade means is secured with the second portion of the second member with its cutting edge spaced from the resilient element when the members are in their opened terminal position and moves toward the surface of the resilient element for engaging and inflicting a minute flaw on the surface of the optical fiber supported by the resilient element when the memebers are actuated by the handle means to assume their closed terminal position. The surface of the resilient element is substantially plane and it extends horizontally in the direction of relative movement of the members as they move between their terminal positions. As the members approach their closed terminal position, the edge of the blade means is substantially parallel to the surface of the resilient element and moves horizontally and transverse to a fiber supported thereon in a scrubbing or sawing action for inflicting the minute flaw on its glass surface. The blade means also moves in a direction toward the resilient element for compressing it and bending the optical fiber supported thereon. This results in placing the surface of the fiber on which the flaw is inflicted under compression as the members assume their closed terminal position. The ends of the second portions of the members are also each provided with a resilient pad unit having a contact surface opposite to and spaced from the contact surface of the other unit when the members are in their opened terminal position. The contact surfaces of the pad units move toward each other and into engagement as the members assume their closed terminal position for applying compressive force to a fiber which is positioned therebetween for completing the severing operation when the fiber is slidingly withdrawn.

Stop means are provided for the first and second members for limiting their motion between their opened and closed terminal positions. The relative positions of the members when in their closed terminal position are thus precisely determined. This permits the final position of the edge of the blade means with respect to the surface of the resilient element to be preset, since the blade means is adjustably secured with the second member. Spring means are provided for returning the members to their normally opened terminal position when the actuating force is removed from the handle means.

BRIEF DESCRIPTION OF THE DRAWING

The foregoing and other objects of the invention will become more apparent as the following detailed description of the invention is read in conjunction with the drawing, in which:

FIG. 1 is a perspective view of a tool means of the invention for severing an optical fiber in its opened terminal position having the lower portions of the hand means broken away, FIG. 2 is an enlarged front view of the top portion of the tool means shown in FIG. 1, FIG. 3 is a rear view of the portion of the tool means shown in FIG. 2, FIG. 4 is an enlarged view of a portion of the tool means shown in FIG. 2 with an optical fiber shown in position for having a flaw inflicted thereon, FIG. 5 is a view similar to that of FIG. 4 illustrating the tool means with its members displaced toward their closed terminal position, FIG. 6 is a view similar to that of FIG. 4 illustrating the tool means with its members displaced to assume their closed terminal position, FIG. 7 is a sectional view taken on the line 7—7 of FIG. 6, FIG. 8 is an enlarged perspective view of an optical fiber which has had a flaw inflicted on its surface by the tool means, and FIG. 9 is an enlarged sectional view taken on the line 9—9 of FIG. 6 showing an optical fiber after having a flaw inflicted thereon positioned between and having compressive force exerted thereon by the pad units of the tool means in its closed terminal position for completing the severing operation.

Like reference numerals designate like parts throughout the several views.

DETAILED DESCRIPTION OF THE INVENTION

Refer to the figures which disclose a tool means 10 embodying the invention. The tool means 10 which is provided for severing an optical fiber 12 includes first and second elongated members 14 and 16. The members 14 and 16 are joined together by pivotal connecting means 18 which may comprise bolt and nut means 19. The first member 14 has first and second portions 20 and 22 on opposite sides of the connecting means 18, and the second member 16 has corresponding first and second portions 24 and 26. The first portions 20 and 24 of the first and second members 14 and 16 are spaced opposite to each other for providing handle means 28 for moving the members 14 and 16 between their opened and closed terminal positions. Contoured plastic hand grip means 32, 34 may be provided for the first portions of the members 14 and 16 to facilitate manual actuation of the tool means 10. The second portions 22 and 26 of the members 14 and 16 are spaced opposite to each other when the members are in their opened terminal position and move closer as the members assume their closed terminal position. Spring means 30 which may be in the form of a leaf spring element having one end attached to the portion 20 of the first member 14 and a second end bearing against the first portion 24 of the second member 16 urges the members 14 and 16 toward their normal opened terminal position shown in FIG. 1.

The second portion 22 of the first member 14 is provided with a fiber supporting means 36 including a block 38 which may be integral or secured by bolt means 40 with the side surface 41 of the member 14. The block 38 extends in a direction toward the second portion 26 of the member 16 as shown in FIG. 2. A fiber guide means 42 is secured to the block 38 by bolt means 44 at its end 46 closest to the member 16. As shown in FIGS. 1 and 3, the guide means 42 has a transversely extending horizontal shelf portion 43, a lower horizontal base portion 48 supporting an elastic element 50, and a pair of spaced side retaining portions 52, 54. The shelf portion 43 and the top surface 56 of the resilient element 50 support the fiber 12 upon which the flaw is to be inflicted, while the side retaining portions 52, 54 extend above the top surface 56 of the resilient element 50 for restricting the fiber therebetween. The resilient element 50 can be of a low durometer sponge rubber material of approximately one quarter inch thickness, although its thickness can be varied according to the durometer of the material to provide the resilience desired.

The blade means 58 which is secured with the second portion of the second member may be of silicon carbide, sapphire, diamond, tungsten carbide or of other suitable material. The edge 60 is preferably honed to approximately 25° to form a smooth linear edge. The blade means 58 with its cutting edge 60 facing downwardly is retained by bolt means 62 within a slot 63 provided in the second portion of the second member 16. The angle and position of the blade means 58 within the slot 63 is adjustable with the bolt means 62 loosened and is fixed by being clamped within the slot 63 by the tightening of the bolt means 62. The cutting edge 60 of the blade 58 is positioned to extend in the direction towards the second portion 22 of the first member 14 and to coact with the resilient element 50 of the fiber retaining means 36 for inflicting a minute flaw upon the glass surface of an optical fiber during the operation of the tool means 10. The term "flaw" as used herein designates a condition on the outer glass surface of an optical glass fiber such as a scribe mark, crack, or other defect provided for originating a break in the fiber, and as known in the prior art and referred to in the article entitled Optical Fiber End Preparation For Low-Loss Splices by D. Gloge, P. W. Smith, D. L. Bisbee, and E. L. Chinnock, published in The Bell System Technical Journal, Vol. 52, No. 9, November, 1973.

The top ends 64 and 68 of the second portions 22 and 26 each have inwardly facing vertical mounting surface 66, 70 spaced opposite to each other. Resilient pad units 72 and 74 are mounted respectively on the surfaces 66 and 70 and have inwardly facing plane surfaces 76 and 78. The surfaces 76 and 78 are spaced from each other when the members are in their opened terminal position and approach and contact each other when the members move toward each other and assume their closed terminal position as shown in FIG. 6. The pad units 72, 74 also may be of sponge rubber material having a low durometer value and a thickness of approximately of one quarter of an inch or other thickness for providing the desired pressure upon an optical fiber 12 received therebetween (see FIG. 9) for completing the severing operation when the fiber is slidingly withdrawn.

In the use of the tool means 10 for severing an optical fiber such as the fiber 12 shown in FIG. 8, the outer protective covering 80 of the fiber 12 is removed to provide an uncovered portion 82. Any silicon or other thin protective coating over the glass surface of the uncovered portion 82 is also preferably removed to expose the glass surface of the fiber. The optical fiber 12 is placed upon the horizontal extending shelf portion 43 of the guide means 42 as seen in FIG. 1, so that the uncovered portion 82 which is to have a flaw inflicted thereon rests upon the horizontal surface 56 of the resilient element 50. The shelf 43 may have a vertically depressed step portion 45 for accommodating the uncovered portion 80 of the fiber 12 and accurately locating the flaw which is to be inflicted. If desirable, the shelf portion 43 may be provided with a scale 47 to allow the optical fiber 12 to be positioned for inflicting the flaw at a selected distance.

With the fiber positioned as shown in FIG. 1, the handle portion 28 is gripped and actuated by hand to move the first portions 22, 26 of the members toward each other against the action of the spring 30. This causes the members 14 and 16, to move from their opened terminal position shown in FIG. 1 toward their closed terminal position shown in FIG. 6. This relative movement is indicated by the arrows 84 of FIGS. 1 and 2 in which the pad unit 74 of the second member 16 is shown to move toward the pad unit 72 of the first member 14. The FIGS. 4, 5 and 6 illustrate the movement of the members between their opened and closed terminal positions. FIG. 4 shows the cutting edge 60 of the blade means 58 forming an acute angle with the horizontal surface 56 of the resilient element 50 when the members are in their opened terminal position. The continued motion of the members 14 and 16 toward their closed terminal position results in a horizontal and downward movement of the blade means 58 with respect to the resilient element 50 so that it overlies the surface 56. The acute angle is also reduced so that the edge 60 becomes substantially parallel to the surface 56. As the members finally assume their closed terminal position shown in FIG. 6, the edge 60 of the razor 58 engages the surface of the uncovered portion 82 of the optical fiber 12 and inflicts a minute flaw 86 thereon. The edge 60 moves in a substantially horizontal and transverse direction across the portion 82 of the optical fiber 12 to provide a scrubbing or sawing action. During such motion, the slight imperfections in the sharpened edge 60 of the blade means 58 act as tiny chisels to provide the defect or minute flaw in the glass surface of the fiber 12 with only a single slight movement. As the blade edge moves across the portion 82 of the fiber, it also moves in the downward direction to a small extent, depressing the fiber 12 into the resilient element 50. The resilience of the element 50 limits and controls the pressure exerted by the edge 60 on the fiber 12 when the flaw 86 is inflicted. The resiliency of the pad element 56 also accommodates variations in the size of the fiber and in the preset positioning of the razor blade, so that the tool means 10 inflicts a flaw which is highly precise and consistent in its extent and character. This results in a highly reliable and accurate severing of the fiber to produce the desirable end surfaces by the tool means 10. The slight downward motion of the blade 58 as it moves across the fiber to inflict a flaw also places in compression the upper surface of the fiber on which the flaw is being inflicted. This has the effect of preventing the enlargement of the flaw or the premature cleaving of the fiber as might otherwise be caused by the presence of tension on this surface.

The movement of the members is limited by a closed position stop means provided by the vertical surface 88 of the second member 16 as it engages the opposite vertical surface 90 of the member 14 to accurately determine the closed terminal position. The closed position stop means when engaged prevent further interaction of the blade means 58 with the fiber 12. When the actuating force applied to the handle means 28 is removed the members 14 and 16 move in the opposite direction away from each other disengaging the blade means from the fiber and towards their opened terminal position. The opened terminal position is determined by the engagement of an opened position stop means comprising a portion 92 of the second member 16 and opposing portion of the member 14. The spring means 30 maintains the members in their fixed opened position when the tool means 10 is not actuated.

After the flaw 86 is inflicted on the uncovered portion 82 of the fiber 12 (FIG. 8), the severing operation is completed by positioning the portion 82 with its flaw 86 between the contact surfaces 76 and 78 of the resilient pad unit 72 and 74. The members 14 and 16 are actuated to assume their closed terminal position as shown in FIGS. 6 and 9. The fiber 12 with its flaw 86 is drawn between the resilient pad unit 72 and 74 as indicated by the arrow 94. The compressive force exerted upon the surface of the optical fiber 12 by the pad units 72, 74 produces a frictional force which upon the moving fiber tensions the fiber to result in severing the fiber at the inflicted flaw 86. This severing operation provides the fiber with mirror smooth end surfaces which are substantially perpendicular to the axial direction of the fiber 12.

Although the invention has been described with respect to a particular embodiment, it will be obvious to those skilled in the art, that the invention disclosed may be modified to meet various design requirements without substantial departure from the essence of the invention.

What is claimed is:

1. Tool means for severing an optical glass fiber comprising first and second members joined by pivotal connecting means for pivotal movement relative to one another, each member having first and second end portions on opposite sides of the connecting means, the first end portions providing opposing jaws and the second end portions providing handle means for moving said jaws toward and away from one another, a resilient element carried by one jaw having a surface for supporting thereon an optical fiber to be severed, blade means secured to the other jaw having a cutting edge spaced from the resilient element when the jaws are separated, said jaws being relatively movable toward one another by said handle means to move said blade means toward the surface of the resilient element for engaging and inflicting a flaw on the surface of an optical fiber supported by the resilient element, and resilient pad units secured to said jaws for receiving therebetween and applying compressive force to a fiber having an inflicted flaw on its surface.

2. The tool means of claim 1 in which the edge of the blade means moves substantially parallel to the surface of the resilient element and transversely to the fiber supported thereon for inflicting the flaw.

3. The tool means of claim 1 in which said jaws have opposing inwardly facing plane surfaces, and said pad units are secured to said jaw surfaces.

4. The tool means of claim 3 in which each of the pad units has a substantially plane outer contact surface, the contact surfaces of the pad units are substantially parallel and engage each other to compress the pad units as the members assume their closed terminal positions for exerting compressive force upon an optical fiber positioned therebetween.

5. The tool means of claim 4 in which the first and second members are provided with stop means for limiting the relative motion of the members between open and closed terminal positions, and the position of said blade means is adjustable with respect to the resilient elements for determining the position of the edge of the blade means with respect to the surface of the resilient element as the members assume their closed terminal positions.

6. The tool means of claim 5 which includes spring means for urging the members toward their open terminal positions.

7. Tool means for severing an optical glass fiber comprising first and second members joined by pivotal connecting means for pivotal movement relative to one another, each member having first and second end portions on opposite sides of the connecting means, the first end portions providing opposing jaws and the second end portions providing handle means for moving said jaws toward and away from one another, a resilient element carried by one jaw having a surface for supporting thereon an optical fiber to be severed, blade means secured to the other jaw having a cutting edge spaced from the resilient element when the jaws are separated, said jaws being relatively movable toward one another by said handle means to move said blade means toward the surface of the resilient element in a manner such that said cutting edge moves substantially parallel to the surface of the resilient element and transvers to the fiber supported thereon for engaging and inflicting a flaw on the fiber.

8. The tool means of claim 7 in which said jaws have opposing inwardly facing plane surfaces, and includes pad units secured to said jaw surfaces.

9. The tool means of claim 8 in which said members are relatively movable between open and closed terminal positions, each of the pad units has a substantially plane outer contact surface, and the contact surfaces of the pad units are substantially parallel and engaged with one another to compress the pad units as the members assume their closed terminal positions for exerting compressive force upon an optical fiber positioned therebetween.

10. The tool means of claim 9 in which the edge of the blade means forms an acute angle with surface of the resilient element when the members are in their open terminal positions, the acute angle decreases as the members move toward and assume their closed terminal positions, and the edge of the blade means traverses the fiber in a scrubbing movement to inflict a minute flaw on the glass surface of the fiber.

11. The tool means of claim 10 in which the members are provided with stop means for limiting the motion of the members between their open and closed terminal positions, and the position of said blade means is adjustable with respect to the resilient element for determining the position of the edge of the blade means with respect to the surface of the resilient element as the members assume their closed terminal positions.

12. The tool means of claim 11 which includes spring means for urging the members toward their open terminal positions.

13. Tool means for severing an optical glass fiber comprising first and second members joined by pivotal connecting means for pivotal movement relative to one another between open and closed terminal positions, each member having first and second end portions on opposite sides of the connecting means, the first end portions providing opposing jaws and the second end portions providing handle means for moving said jaws toward and away from one another, a resilient element carried by one jaw having a surface for supporting thereon an optical fiber to be severed, the surface of the resilient element being substantially plane and extending substantially in the direction of the relative movement of the members, blade means secured to the other jaw having a cutting edge spaced from the resilient element when the jaws are separated, said jaws being relatively movable toward one another by said handle means to move said blade means toward the surface of the resilient element for engaging and inflicting a flaw on the surface of an optical fiber supported by the resilient element.

14. The tool means of claim 13 in which the edge of the blade means is substantially linear and extends in a direction substantially parallel to the surface of the resilient element as the members assume their closed terminal positions and the edge of the blade means engages the surface of the resilient element.

15. The tool means of claim 14 in which the edge of the blade means is angularly disposed with respect to the surface of the resilient element when the members are in their open terminal positions, and the angular disposition of the edge of the blade means with respect to the surface of the resilient element decreases as the members move toward their closed terminal positions.

16. The tool means of claim 15 in which the edge of the blade means moves along and is substantially parallel to the surface of the resilient element and transverse to the optical fiber as the members assume their closed terminal positions for inflicting the flaw thereon.

17. The tool means of claim 16 in which the edge of the blade means has a component of motion in the direction toward the resilient element for compressing the resilient element and bending the optical fiber supported thereon as the members assume their closed terminal positions for placing in compression the surface of the fiber on which the flaw is being inflicted.

18. The tool means of claim 17 in which the edge of the blade means forms an acute angle with the surface of the resilient element when the members are in their open terminal positions, the acute angle decreases as the members move toward and assume their closed terminal positions, and the edge of the blade means traverses the fiber in a scrubbing movement to inflict a minute flaw on the glass surface of the fiber.

19. The tool means of claim 18 in which the first and second members are provided with stop means for limiting the motion of the members between their open and closed terminal positions, and the position of blade means is adjustable with respect to the resilient element for determining the position of the edge of the blade means with respect to the surface of the resilient element as the members assume their closed terminal positions.

20. The tool means of claim 19 which includes spring means for urging the members toward their open terminal positions.

21. A tool for flawing an optical filter to induce severing of the fiber, comprising a pair of pivotal members, and pivot means joining said members between their ends for relative pivotal movement of the members about a pivot axis between said ends, said members having first opposing end portions forming handles and second opposing end portions forming jaws which are relatively movable toward and away from one another about said axis by relative movement of said handles toward and away from one another, a cutter on one jaw having a cutting edge disposed in a plane substantially normal to said axis, supporting means on the other jaw for supporting an optical fiber in a flawing position wherein the fiber extends across and substantially normal to said plane, and means for securing said cutter and supporting means to their respective jaws in fixed positions relative to the jaws such that the cutter and supporting means are relatively movable with the jaws toward and away from one another about said axis, and said cutting edge undergoes relative endwise movement in said plane across and in scoring contact with the fiber in said flawing position.

22. The tool of claim 21 wherein: said cutting edge has a fixed component of relative lateral movement against the fiber during relative endwise movement of the cutting edge across the fiber, whereby said cutting edge exerts a lateral force on the fiber in the direction of said component, and said fiber supporting means comprises a resiliently yieldable fiber support which is yieldable in the direction of said component under the action of said lateral force to limit the contact pressure of said cutting edge against the fiber.

23. The tool of claim 21 including: means for stressing in compression the fiber surface engagable by said cutting edge.

24. The tool of claim 21 wherein: said cutting edge has a fixed component of relative lateral movement against the fiber during relative endwise movement of the cutting edge in one direction across the fiber, whereby said cutting edge exerts on the fiber a lateral force in the direction of said component, and said fiber supporting means comprises a resilient pad against which said cutting edge presses the fiber to bend the latter in a manner to stress in compression the fiber surface in contact with the cutting edge.

25. The tool of claim 24 wherein: said pad has a resiliency which limits the contact pressure of said cutting edge against the fibers.

26. A plier-type hand tool for severing an optical fiber, comprising:
a pair of members pivotally joined between their ends and having first opposing end portions forming jaws and second opposing end portions forming handles for moving said jaws toward and away from one another, means on said jaws for supporting an optical fiber and inflicting a severance inducing flaw in the fiber without severing the fiber upon movement of said handles toward one another, and means on said jaws separate from said flaw inflicting means whereby a flawed fiber may be stressed in tension across the flaw to sever the fiber at the flaw.

27. The tool of claim 26 wherein: said fiber stressing means comprises resilient pads on said jaws for gripping the fiber at one side of the flaw with the fiber at the other side of the flaw exposed for application of a tension force to the fiber.

* * * * *